US010995800B2

(12) United States Patent
Iyer et al.

(10) Patent No.: US 10,995,800 B2
(45) Date of Patent: May 4, 2021

(54) FLEXIBLE COUPLING FOR A DRIVE SYSTEM

(71) Applicant: Goodrich Corporation, Charlotte, NC (US)

(72) Inventors: Raghu Iyer, New Hartford, NY (US); Joshua Larson, Rome, NY (US)

(73) Assignee: Goodrich Corporation, Charlotte, NC (US)

( * ) Notice: Subject to any disclaimer, the term of this patent is extended or adjusted under 35 U.S.C. 154(b) by 398 days.

(21) Appl. No.: 15/903,488

(22) Filed: Feb. 23, 2018

(65) Prior Publication Data

US 2019/0264750 A1  Aug. 29, 2019

(51) Int. Cl.
*F16D 3/72* (2006.01)
*F16D 3/10* (2006.01)

(52) U.S. Cl.
CPC ............... *F16D 3/72* (2013.01); *F16D 3/10* (2013.01)

(58) Field of Classification Search
CPC ...................................... F16D 3/72; F16D 3/10
USPC ............................................. 464/79, 99
See application file for complete search history.

(56) References Cited

U.S. PATENT DOCUMENTS 1,910,880 A * 5/1933 Blake .................. F16D 3/72
464/79

3,026,099 A * 3/1962 Ipsen ................... F27B 9/2407
464/79
2004/0005929 A1   1/2004 Piasecki et al.

FOREIGN PATENT DOCUMENTS

| GB | 24436 A | 10/1914 |
|----|---------|---------|
| WO | WO9212356 A1 | 7/1992 |
| WO | WO2016108340 A1 | 7/2016 |

OTHER PUBLICATIONS

Extended European Search Report for EP Application No. 19158594.2, dated Jul. 12, 2019, pp. 7.

* cited by examiner

*Primary Examiner* — Greg Binda
(74) *Attorney, Agent, or Firm* — Kinney & Lange, P.A.

(57) ABSTRACT

A coupling includes a diaphragm assembly, a sleeve, a stud, and a ball bearing system. The diaphragm assembly includes a first end, a second end, and an opening extending axially through the diaphragm assembly with the diaphragm assembly also including a first annular diaphragm pair. The sleeve extends into the opening and has a bore. The stud extends at least partially within the bore of the sleeve and within the opening. The ball bearing system is concentric with and radially between the sleeve and the stud with the ball bearing having an outer race adjacent to the sleeve, an inner race adjacent to the stud, and at least two rows of ball therebetween with the outer race having an arced shape when viewed in a circumferential direction to allow for axial movement of the at least two rows of ball bearings relative to the outer race.

20 Claims, 2 Drawing Sheets

FLEXIBLE COUPLING FOR A DRIVE SYSTEM

BACKGROUND

The present disclosure relates to the coupling of rotating components and, in particular, to a flexible coupling for transmitting power and accommodating angular misalignment between rotating shafts, such as in aircraft transmission devices.

Drive systems include power transmission couplings between rotatable members. These couplings transmit power from an engine to a gearbox or from a rotatable driving shaft to a rotatable driven shaft. These shafts can axially, angularly, and/or radially misaligned. Flexible couplings capable of carrying high torque and high bending stress are employed for coupling such rotatable members.

SUMMARY

A coupling includes a diaphragm assembly, a sleeve, a stud, and a ball bearing system. The diaphragm assembly includes a first end, a second end, and an opening extending axially through the diaphragm assembly with the diaphragm assembly also including a first annular diaphragm. The sleeve extends into the opening and has a bore. The stud extends at least partially within the bore of the sleeve and within the opening. The ball bearing system is concentric with and radially between the sleeve and the stud with the ball bearing having an outer race adjacent to the sleeve, an inner race adjacent to the stud, and at least two rows of ball therebetween with the outer race having an arced shape when viewed in a circumferential direction to provide for axial movement of the at least two rows of ball bearings relative to the outer race to allow for the stud to pivot relative to the sleeve to accommodate angular misalignment but not axial elongation or suppression.

A torque transmitting arrangement includes a first shaft, a second shaft in operable communication with the first shaft, at least one diaphragm in operable communication with the first shaft and the second shaft configured to allow torque to be transmitted between the first shaft and the second shaft while allowing for axial movement and angular misalignment between the first shaft and the second shaft, and a bearing assembly in operable communication with the first shaft and the second shaft configured to allow but limit axial movement as well as angular misalignment between the first shaft and the second shaft. The bearing assembly further including a first row of ball bearings axially displaced from a second row of ball bearings with both the first row and second row of ball bearings being positioned between an inner race and an outer race and the outer race defining an arc extending axially between the first row and the second row of ball bearings to provide for axial movement of the first row and second row of ball bearings relative to the outer race to allow for the second shaft to pivot relative to the first shaft to accommodate angular misalignment but not axial elongation or suppression.

DETAILED DESCRIPTION

A flexible coupling is disclosed that connects two machines transmitting torque through rotation. The two machines described for exemplary purposes only in this disclosure are a gearbox and a shaft tube. The flexible coupling includes a sleeve connected to the gearbox and a stud connected to the shaft tube, both of which are radially inward from a flexible diaphragm assembly. The stud extends axially within a bore in the sleeve, and a self-aligning ball bearing system is located between and is concentric with the sleeve and the stud. The self-aligning ball bearing system includes an outer race adjacent to the sleeve, an inner race adjacent to the stud, and at least two axial rows of ball bearings therebetween. The outer race has an arced shape when viewed in a circumferential direction to allow axial movement of the ball bearings relative to the outer race. The accommodation of axial movement of the ball bearings relative to the outer race allows the inner race and stud to pivot (i.e., allows for angular misalignment of the stud relative to the sleeve), therefore allowing the shaft tube connected to the stud to also pivot/angularly misalign. With the stud being able to pivot relative to the sleeve, the flexible coupling allows for the shaft tube and gearbox to move radially independently from one another to accommodate movement of the gearbox and the shaft tube (and possibly a second gearbox attached to the other end of the shaft tube) caused by thermal expansion/contraction while still allowing rotational energy to be transmitted between the shaft tube and the gearbox.

Figure 1A:
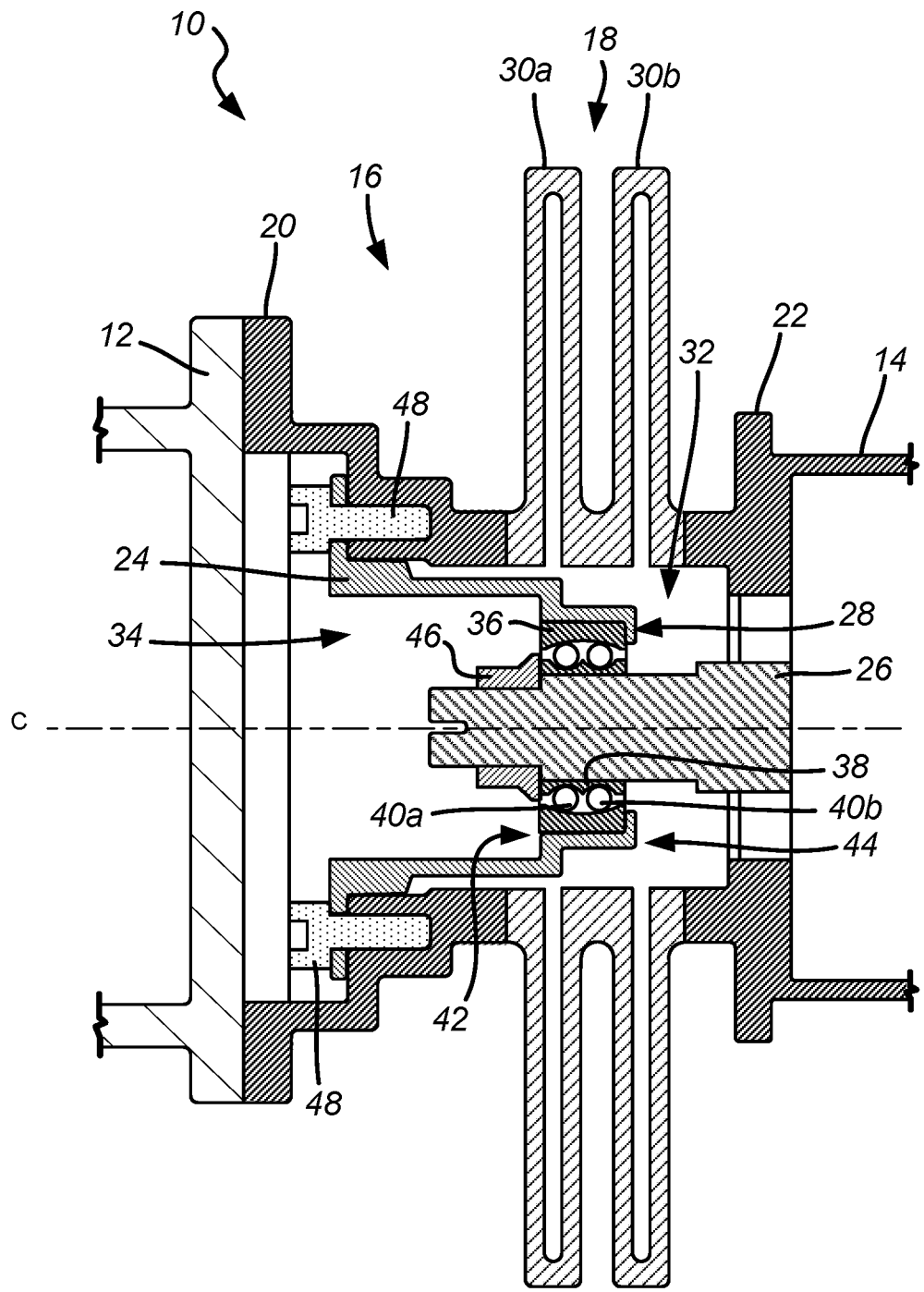
FIG. 1A is a cross-sectional view of a coupling between a two torque transmitting machines.
Figure 1B:
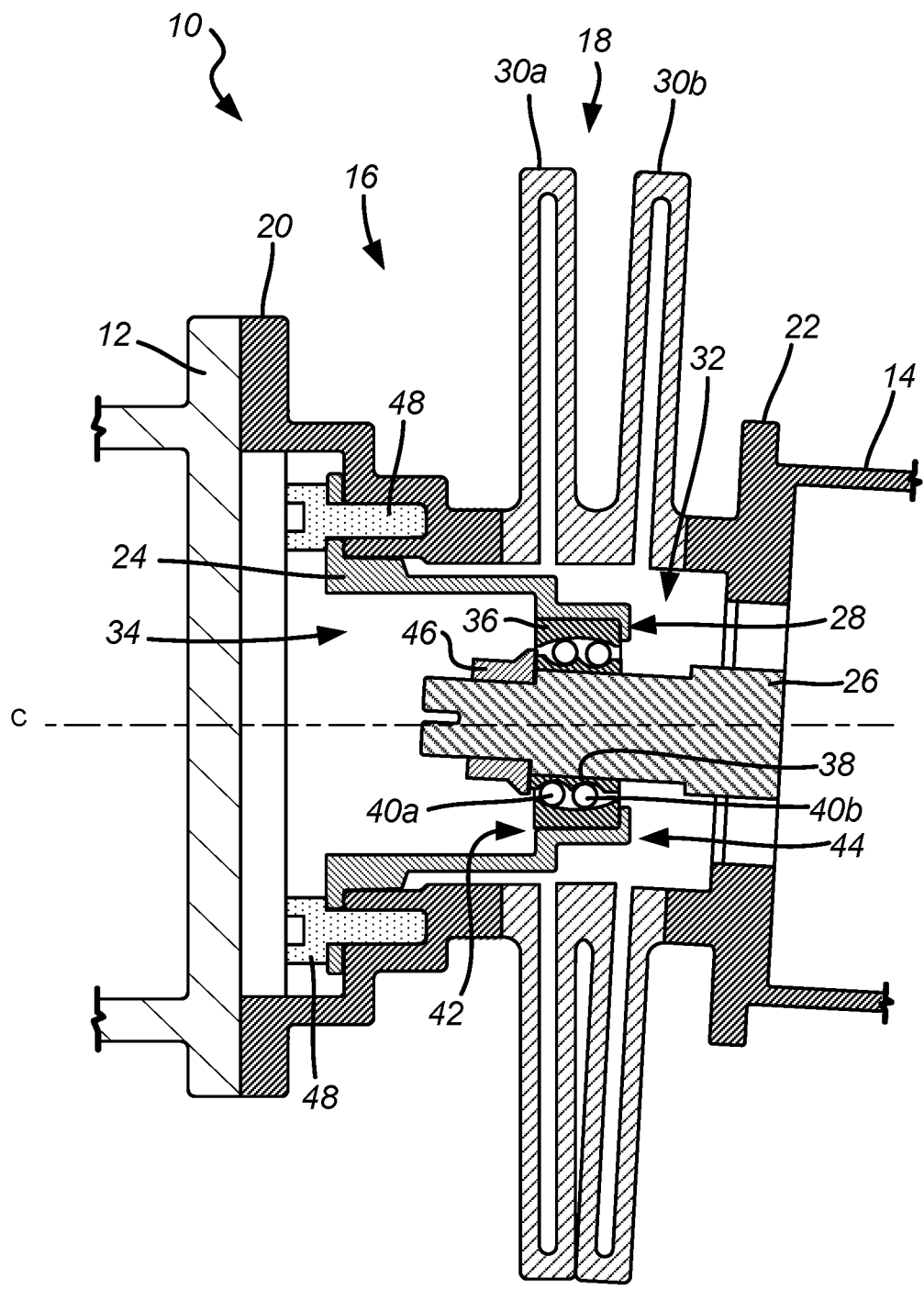
FIG. 1B is a cross-sectional view of the coupling in FIG. 1A experiencing angular misalignment.

FIG. 1A is a cross-sectional view of a flexible coupling between two torque transmitting machines, such as a gearbox and a shaft tube in a gas turbine engine, while FIG. 1B is a cross-sectional view of the flexible coupling in FIG. 1A experiencing angular misalignment. FIG. 1B is exaggerated regarding the angular misalignment of the flexible coupling. While this disclosure describes the flexible coupling as being between a gearbox and a shaft tube in a gas turbine engine, the flexible coupling can be utilized within or between any torque transmitting machines.

Gas turbine engine 10 includes gearbox 12, shaft tube 14, coupling 16 extending along centerline C, first flange 20, and second flange 22. Coupling 16 includes diaphragm assembly 18, sleeve 24, stud 26, and self-aligning ball bearing system 28. Diaphragm assembly 18 includes first diaphragm pair 30a and second diaphragm pair 30b with opening 32 extending axially along centerline C. Sleeve 24 includes bore 34 that extends axially along centerline C at least partially within opening 32. Self-aligning ball bearing system 28 includes outer race 36, inner race 38, first ball bearing row 40a adjacent first side 42 of self-aligning ball bearing system 28, and second ball bearing row 40b adjacent second side 44 of self-aligning ball bearing system 28. Stud 26 can also include nut 46. Sleeve 24 can be removably connected to first flange 20 by bolts 48.

Gas turbine engine 10 includes a drive system with shaft tube 14 able to extend between gearbox 12 and another rotating component (not shown), such as another gearbox. While coupling 16 is shown in this disclosure as being part of gas turbine engine 10, coupling 16 can be utilized to connect any rotating components that need to accommodate angular misalignment while transmitting torque. Thus, the use of coupling 16 to connect gearbox 12 and shaft tube 14 in gas turbine engine 10 is provided only as an example and should not be viewed as limiting coupling 16. All components shown in FIGS. 1A and 1B of gas turbine engine 10 rotate in unison during operation of gas turbine engine 10 to transmit energy/loads between gearbox 12 and shaft tube 14. Because gas turbine engine 10 can experience elevated temperatures during operation, coupling 16 is necessary to accommodate angular misalignment between gearbox 12 and shaft tube 14 due to thermal expansion.

Gearbox 12 extends axially along centerline C and can include various projections to allow connection of gearbox 12 to other components, such as first flange 20 (which in turn connects to coupling 16). Gearbox 12 can be connected to first flange 20 through various means, including welding, brazing, or fasteners.

First flange 20 extends between and connects gearbox 12 to diaphragm assembly 18 and, more particularly, to first diaphragm pair 30a. First flange 20 is annular in shape and can have an axially stair-stepping configuration that connects the radially larger gearbox 12 to an edge of the radially smaller first diaphragm pair 30a (first diaphragm pair 30a has other features not explicitly described, such as inner and outer features). Further, first flange 20 can include orifices, such as threaded holes, into which bolts 48 can extend to connect first flange 20 to sleeve 24. First flange 20 can be connected to gearbox 12 and diaphragm assembly 18 through various means, including welds, braze, or fasteners. First flange 20 rotates in unison with gearbox 12 and the other components of coupling 16 and remains axially centered about centerline C along with gearbox 12.

Shaft tube 14 can extend substantially axially along centerline C and can be a hollow cylindrical tube that connects gearbox 12 (through the use of coupling 16) to another rotating component (not shown), such as another gearbox. Shaft tube 14 can include various projections to allow connection of shaft tube 14 to other components, such as second flange 22 (which in turn connects to coupling 16). Shaft tube 14 can be connected to second flange 22 through various means, including welding, brazing, or fasteners, or shaft tube 14 can be formed along with second flange 22 during the manufacturing process to create one continuous and monolithic component. As shown in FIG. 1B, shaft tube 14 can experience angular misalignment such that shaft tube 14 is not collinear with centerline C but rather is at an angle to centerline C. This angular misalignment is accommodated by coupling 16 so that shaft tube 14 and gearbox 12 remain connected to one another to transmit rotational energy/loads/torque.

Second flange 22 extends between and connects shaft tube 14 to diaphragm assembly 18 and, more particularly, to second diaphragm pair 30b. If diaphragm assembly 18 is configured to include only one diaphragm, then second flange 22 is connected to an edge of first diaphragm pair 30a. Second flange 22 is annular in shape and can have a radially outward extending projection to provide increased strength and/or a radially inward stair-step that reduces the radial diameter/size of second flange 22 to connect the radially larger shaft tube 14 to an edge of the radially smaller second diaphragm pair 30b (second diaphragm pair 30b has other features not explicitly described, such as inner and outer features). Second flange 22 can be connected to shaft tube 14 and diaphragm assembly 18 through various means, including welds, braze, or fasteners. Further, second flange 22 and shaft tube 14 can be one continuous and monolithic component that is formed as one component during the manufacturing process. First flange 20 and second flange 22 can have the same functionality and configuration by connecting radially larger components, such as gearbox 12 and shaft tube 14, to radially smaller components, such as diaphragm assembly 18.

Coupling 16 extends along centerline C and connects gearbox 12 (specifically, first flange 20) to shaft tube 14 (specifically, second flange 22). Coupling 16 is able to bend to accommodate the misalignment of gearbox 12 and shaft tube 14. Coupling 16, gearbox 12, and shaft tube 14 rotate in unison within gas turbine engine 10. As described below, coupling 16 is able to accommodate angular misalignment between gearbox 12 and shaft tube 14, which may result from thermal expansion of gearbox 12 and shaft tube 14 (or the other component to which shaft tube 14 is connected).

Diaphragm assembly 18 is the radially outermost component of coupling 16 and extends between first flange 20 (adjacent gearbox 12) and second flange 22 (adjacent shaft tube 14). Diaphragm assembly 18 is annular in shape with opening 32 being an orifice that can extend substantially axially along centerline C. Diaphragm assembly 18 includes annular first diaphragm pair 30a adjacent first flange 20 and annular second diaphragm pair 30b adjacent second flange 22. Diaphragm assembly 18 can be one continuous and monolithic component with any number of annular diaphragm pairs, including only one diaphragm pair (first diaphragm pair 30a) or more than two diaphragm pairs depending on the amount of flexibility needed for diaphragm assembly 18. As shown in FIG. 1B, diaphragm assembly 18 is able to accommodate angular misalignment by having an accordion-like structure that can bend in any radial direction and/or extend or compress in a substantially axial direction. The accordion-like structure includes gaps in first diaphragm pair 30a and second diaphragm pair 30b that allow for closure of a gap within diaphragm assembly 18 while the other radial side of diaphragm assembly 18 is extending (i.e., the portion of diaphragm assembly 18 that is 180 degrees away). As a result, the separation between first diaphragm pair 30a and second diaphragm pair 30b increases at the top and creases at the bottom as shown in FIG. 1B. Diaphragm assembly 18 can be constructed from any material able to handle the stresses and strains of flexing, transmitting torque, and rotating with gearbox 12 and shaft tube 14.

Sleeve 24 is radially inward from and connected to first flange 20 and extends into opening 32 of diaphragm assembly 18. Sleeve 24 can be annular in shape with bore 34 being a cylindrical opening extending along centerline C. Sleeve 24 can be connected to first flange 20 by bolts 48 adjacent gearbox 12, which can be threaded to correspond to threaded holes in first flange 20, at an end or by other means other than bolts 48. With sleeve 24 being connected to first flange 20 and gearbox 12, sleeve 24 moves in unison with those two components and remains axially centered about centerline C and collinear with gearbox 12 and first flange 20 even when shaft tube 14 is angularly misaligned with gearbox 12. Sleeve 24 can be constructed from any material that is able to resist force from axial loads passing through shaft tube 14, coupling 16 (including stud 26, and self-aligning ball bearing system 28), and sleeve 24. While sleeve 24 is shown as an annular component having a substantially cylindrical shape with a stair step radially inward from first diaphragm pair 30a, sleeve 24 can have other configurations able to provide sufficient strength and able to accommodate self-aligning bearing ball system 28 and stud 26. Sleeve 24 can also include a radially inward extending first flange adjacent second side 44 of self-aligning ball bearing system 28 to prevent axial movement of self-aligning ball bearing system 28 towards second side 44. Thus, during disassembly of coupling 16, bolts 48 can be removed (along with nut 46 of stud 26) and sleeve 24 along with self-aligning ball bearing system 28 can slide out of opening 32 axially to the left in FIGS. 1A and 1B. As shown in FIGS. 1A and 1B, sleeve 24 extends within opening 32, but sleeve 24 is not in contact with diaphragm assembly 18 to allow some clearance for diaphragm assembly 18 to bend to accommodate angular misalignment of shaft tube 14, second flange 22, and stud 26.

Stud 26 is located partially radially inward from and connected to second flange 22 and extends axially at least partially into bore 34 of sleeve 24 and into opening 32 of diaphragm assembly 18. Stud 26 can have a cylindrical shape with the end adjacent first flange 20 being threaded to correspond to threaded nut 46 and the end adjacent second flange 22 being connected to second flange 22. With stud 26 being connected to second flange 22 and shaft tube 14, stud 26 moves in unison with those two components and can experience angular misalignment along with second flange 22 and shaft tube 14 as shown in FIG. 1B. Stud 26 can be constructed from any material that is able to resist force from axial loads through coupling 16 between shaft tube 14 and gearbox 12. While stud 26 is shown as a cylindrical component, stud 26 can have other configurations able to provide sufficient strength and able to accommodate self-aligning bearing ball system 28. Stud 26 can also include a radially outward extending flange adjacent second side 44 of self-aligning ball bearing system 28 to prevent axial movement of self-aligning ball bearing system 28 towards second side 44. Further, nut 46 can be configured to be located adjacent first side 42 of self-aligning ball bearing system 28 to prevent axial movement of self-aligning ball bearing system 28 towards first side 42. Thus, self-aligning ball bearing system 28 can be prevented from axial movement in either direction (relative stud 26) by stud 26 with disassembly of coupling 16 being effectuated through the removal of nut 46 and the sliding of sleeve 24 (along with ball bearing system 28) out of opening 32 axially to the left in FIGS. 1A and 1B. Because stud 26 extends into bore 34 of sleeve 24, the configuration prevents flailing of the rotating stud 26, second flange 22, and shaft tube 14 if diaphragm assembly 18 were to fail. More specifically, if diaphragm assembly 18 were to fail such that diaphragm assembly 18 no longer connects first flange 20 to second flange 22, the configuration of stud 26 radially within sleeve 24 can maintain a connection between first flange 20 and second flange 22 to prevent the rotating shaft tube 14 from flailing (i.e., thrashing about without restraint) and causing damage to gas turbine engine 10.

Self-aligning ball bearing system 28 is annular in shape, is located radially between, and is concentric with sleeve 24 and stud 26 (when aligned). Self-aligning ball bearing system 28 includes annular outer race 36 radially adjacent sleeve 24, annular inner race 38 radially adjacent stud 26, and two rows of ball bearings (first bearing row 40a adjacent first side 42 and second bearing row 40b adjacent second side 44) radially between outer race 36 and inner race 38. As described below, self-aligning ball bearing system 28 is configured to allow inner race 38 along with stud 26 to pivot therein to accommodate angular misalignment of shaft tube 14 relative to gearbox 12. Self-aligning ball bearing system 28 can be located anywhere axially along centerline C, but the disclosed embodiment shows self-aligning ball bearing system 28 being radially inward from an axial center of diaphragm assembly 18 to provide clearance and allow for maximum bending of diaphragm assembly 18 to accommodate angular misalignment of shaft tube 14, second flange 22, and stud 26. Self-aligning ball bearing system 28 is self-aligning because self-aligning ball bearing system 28 includes at least two rows of ball bearings and an arc-shaped outer race 36 (described below), which work together to align sleeve 24 and stud 26 when misalignment occurs.

Outer race 36 is annular in shape and radially inward from, adjacent to, and concentric with sleeve 24. Outer race 36 is a common ball bearing system component except that the radially inner surface of outer race 36 has an arced shape when viewed in a circumferential direction as shown in FIGS. 1A and 1B. The arced shape of outer race 36 is a continuous arc and allows for first bearing row 40a and second bearing row 40b to move axially to allow inner race 38 and stud 26 to pivot as shown in FIG. 1B. However, because outer race 36 has an arced shape, the two rows of ball bearings cannot move axially out of self-aligning ball bearing system 28 and are nudged/held radially inward from outer race 36 and axially between first side 42 and second side 44 while still allowing some axial movement. Outer race 36 (and self-aligning ball bearing system 28) can have an axial length that is longer or shorter than that shown in FIGS. 1A and 1B depending upon the amount of angular misalignment needed to be accommodated, as a shorter axial length of self-aligning ball bearing system 28 allows for less angular misalignment (by allowing for less axial movement of the two rows of ball bearings within self-aligning ball bearing system 28) and a longer axial length allows for greater angular misalignment (by allowing for greater movement of the two rows of ball bearings within self-aligning ball bearing system 28). Further, the arc of outer race 36 can be a smooth arc in which all points along the arc have a same radius of curvature, or the arc can have an increase or decrease in the radius of curvature along the axial length of outer race 36. For example, outer race 36 can have a configuration in which the radius of curvature of the arc is smaller near first side 42 and second side 44 (i.e., a tighter curve) with the radius of curvature being larger near an axial middle of outer race 36 (i.e., a wider curve). While outer race 36 is adjacent to sleeve 24, outer race 36 does not need to be connected to sleeve 24 and can be press fit within sleeve 24 to allow for outer race 36 (and the rest of self-aligning ball bearing system 28) to slide within sleeve 24 during disassembly. However, outer race 36 and the rest of self-aligning ball bearing system 28 should be secured during operation so as to remain stationary relative to sleeve 24. This can be accomplished through the use of nut 46 or another configuration, such as a snap ring. Assembly of self-aligning bearing system 28 is such that only inner race 38 and the two rows of ball bearings move to accommodate misalignment (i.e., stud 26 only experiences angular misalignment and does not move axially with respect to sleeve 24) to prevent the stretching and compressing of coupling 16.

Inner race 38 is annular in shape and radially outward from, concentric with, and adjacent to stud 26. Inner race 38 is a common ball bearing system component and can be configured to be used with two axial rows of ball bearings. Thus, inner race 38 can include two circumferentially extending grooves to accommodate first bearing row 40a and second bearing row 40b. While inner race 38 is adjacent to stud 26, inner race 38 does not necessarily need to be connected to stud 26 as inner race 38 can be configured to slide axially relative to stud 26 during disassembly of coupling 16 after nut 46 has been removed. Further, inner race 38 is adjacent to but not otherwise connected to the two rows of ball bearings to allow first bearing row 40a and second bearing row 40b to rotate independently from inner race 38, such as when stud 26 is pivoting relative to sleeve 24.

First bearing row 40a and second bearing row 40b each include multiple spherical ball bearings spaced circumferentially about ball bearing system 28 radially between outer race 36 and inner race 38. Such ball bearings are common in ball bearing systems. While self-aligning ball bearing system 28 is shown as having two rows of ball bearings, other configurations can include one or more than two rows of ball bearings. Because the two rows of ball bearings can move axially and independently within self-aligning ball bearing system 28, a top portion of first bearing row 40a and second bearing row 40b can move towards second side 44 while a bottom portion of first bearing row 40a and second bearing row 40b can move towards first side 42, allowing stud 26, second flange 22, and shaft tube 14 to pivot to angularly misalign downward as shown in FIG. 1B. Self-aligning ball bearing system 28 can also accommodate angular misalignment upward, into the page, and out of the page in a similar fashion.

Coupling 16 with self-aligning ball bearing system 28 located radially between (and concentric with) sleeve 24 and stud 26 and having arc shaped outer race 36, inner race 38, and two rows of bearings therebetween allow for angular misalignment of inner race 38, stud 26, second flange 22, and shaft tube 14 relative to gearbox 12. This configuration ensures that gearbox 12 and shaft tube 14 remain connected to transmit rotational energy/loads/torque between the two while accommodating for thermal expansion. Further, coupling 16 utilizes many components common to ball bearing systems, thus decreasing costs that would otherwise be used to specially manufacture uncommon pieces. The configuration of self-aligning ball bearing system 28 between sleeve 24 and stud 26 allows for easy disassembly of coupling 16 though the ability of sleeve 24 to detach from first flange 20 and of self-aligning ball bearing system 28 to slide off of stud 26. Finally, because stud 26 extends into bore 34 of sleeve 24, coupling 16 provides anti-flail capabilities to prevent further damage to gas turbine engine 10 if diaphragm assembly 18 were to fail.

Discussion of Possible Embodiments

The following are non-exclusive descriptions of possible embodiments of the present invention.

A coupling includes a diaphragm assembly, a sleeve, a stud, and a ball bearing system. The diaphragm assembly includes a first end, a second end, and an opening extending axially through the diaphragm assembly with the diaphragm assembly also including a first annular diaphragm pair. The sleeve extends into the opening and has a bore. The stud extends at least partially within the bore of the sleeve and within the opening. The ball bearing system is concentric with and radially between the sleeve and the stud with the ball bearing having an outer race adjacent to the sleeve, an inner race adjacent to the stud, and at least two rows of ball therebetween with the outer race having an arced shape when viewed in a circumferential direction to allow for axial movement of the at least two rows of ball bearings relative to the outer race.

The coupling of the preceding paragraph can optionally include, additionally and/or alternatively, any one or more of the following features, configurations, and/or additional components:

A first flange connected to the first end of the diaphragm assembly and also to the sleeve and a first rotatable component connected to the first flange.

The sleeve is removably connected to the first flange by bolts.

The first flange is welded to the first side of the diaphragm assembly.

The first flange includes a stair-stepped configuration to extend axially to connect to the diaphragm assembly.

The axial movement of the at least two rows of ball bearings allows for angular misalignment of the stud relative to the sleeve to allow for movement of the stud independent from the sleeve.

The diaphragm assembly, sleeve, stud, and ball bearing system rotate in unison.

A second flange connected to the second side of the diaphragm assembly and also to the stud and a second rotatable component connected to the second flange.

The stud is at least partially threaded and further includes a nut attached to the stud to prevent axial movement of the lower race relative to the stud.

The diaphragm assembly includes a second annular diaphragm pair axially adjacent and connected to the first annular diaphragm pair.

Ball bearing system is press fit within the sleeve.

The stud and inner race are stationary relative to one another.

The inner race includes two circumferentially extending grooves to accommodate two rows of ball bearings.

The sleeve is not in contact with the diaphragm assembly.

The ball bearing system is axially centered within the opening of the diaphragm assembly.

A torque transmitting arrangement includes a first shaft, a second shaft in operable communication with the first shaft, at least one diaphragm in operable communication with the first shaft and the second shaft configured to allow torque to be transmitted between the first shaft and the second shaft while allowing for axial movement and angular misalignment between the first shaft and the second shaft, and a bearing assembly in operable communication with the first shaft and the second shaft configured to allow but limit axial movement as well as angular misalignment between the first shaft and the second shaft. The bearing assembly further including a first row of ball bearings axially displaced from a second row of ball bearings with both the first row and second row of ball bearings being positioned between an inner race and an outer race and the outer race defining an arc extending axially between the first row and the second row of ball bearings.

The torque transmitting arrangement of the preceding paragraph can optionally include, additionally and/or alternatively, any one or more of the following features, configurations, and/or additional components:

The second shaft is axially stationary relative to the inner race of the bearing assembly.

A nut attachable to the second shaft to hold the second shaft stationary relative to the inner race of the bearing assembly.

The arc of the outer race allows the first row and second row of ball bearings to move axially relative to the outer race to allow the second shaft to pivot relative to the first shaft.

The ball bearing assembly is radially inward from an axial center of the at least one diaphragm.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A coupling comprising:
   a diaphragm assembly having a first end, a second end, and an opening extending axially through the diaphragm assembly, the diaphragm assembly including a first annular diaphragm pair;
   a sleeve extending into the opening and having a bore;
   a stud extending at least partially within the bore of the sleeve and within the opening, the stud being at least partially threaded;
   a ball bearing system concentric with and radially between the sleeve and the stud with the ball bearing having an outer race adjacent to the sleeve, an inner race adjacent to the stud, and two rows of ball bearings between the outer race and the inner race, the outer race having an arced shape when viewed in a circumferential direction to allow for axial movement of the two rows of ball bearings relative to the outer race; and
   a nut attached to the stud to prevent axial movement of the inner race relative to the stud.

2. The coupling of claim 1, further comprising:
   a first flange connected to the first end of the diaphragm assembly and also to the sleeve; and
   a first rotatable component connected to the first flange.

3. The coupling of claim 2, wherein the sleeve is removably connected to the first flange by bolts.

4. The coupling of claim 2, wherein the first flange is welded to the first side of the diaphragm assembly.

5. The coupling of claim 2, wherein the first flange includes a stair-stepped configuration to extend axially to connect to the diaphragm assembly.

6. The coupling of claim 1, wherein the axial movement of the at least two rows of ball bearings allows for angular misalignment of the stud relative to the sleeve to allow for movement of the stud independent from the sleeve.

7. The coupling of claim 1, wherein the diaphragm assembly, sleeve, stud, and ball bearing system rotate in unison.

8. The coupling of claim 1, further comprising:
   a second flange connected to the second side of the diaphragm assembly and also to the stud; and
   a second rotatable component connected to the second flange.

9. The coupling of claim 1, wherein the diaphragm assembly includes a second annular diaphragm pair axially adjacent and connected to the first annular diaphragm pair.

10. The coupling of claim 1, wherein ball bearing system is press fit within the sleeve.

11. The coupling of claim 1, wherein the stud and inner race are stationary relative to one another.

12. The coupling of claim 1, wherein the sleeve is not in contact with the diaphragm assembly.

13. The coupling of claim 1, wherein the ball bearing system is axially centered within the opening of the diaphragm assembly.

14. The coupling of claim 1, wherein the inner race includes two circumferentially extending grooves to accommodate the two rows of ball bearings.

15. A coupling comprising:
   a diaphragm assembly having a first end, a second end, and an opening extending axially through the diaphragm assembly, the diaphragm assembly including a first annular diaphragm pair;
   a sleeve extending into the opening and having a bore;
   a stud extending at least partially within the bore of the sleeve and within the opening, the stud being at least partially threaded;
   a ball bearing system concentric with and radially between the sleeve and the stud with the ball bearing having an outer race adjacent to the sleeve, an inner race adjacent to the stud, and at least two rows of ball bearings between the outer race and the inner race, the outer race having an arced shape when viewed in a circumferential direction to allow for axial movement of the at least two rows of ball bearings relative to the outer race; and
   a nut attached to the stud to prevent axial movement of the inner race relative to the stud.

16. The coupling of claim 15, wherein the stud and inner race are stationary relative to one another.

17. The coupling of claim 15, further comprising:
   a first flange connected to the first end of the diaphragm assembly and also to the sleeve; and
   a first rotatable component connected to the first flange.

18. A coupling comprising:
   a diaphragm assembly having a first end, a second end, and an opening extending axially through the diaphragm assembly, the diaphragm assembly including a first annular diaphragm pair and a second annular diaphragm pair axially adjacent and connected to the first annular diaphragm pair;
   a sleeve extending into the opening and having a bore;
   a stud extending at least partially within the bore of the sleeve and within the opening;
   a ball bearing system concentric with and radially between the sleeve and the stud with the ball bearing having an outer race adjacent to the sleeve, an inner race adjacent to the stud, and at least two rows of ball bearings between the outer race and the inner race, the outer race having an arced shape when viewed in a circumferential direction to allow for axial movement of the at least two rows of ball bearings relative to the outer race; and
   a nut threadedly connectable to the stud to prevent axial movement of the inner race relative to the stud.

19. The coupling of claim 18, further comprising:
   a first flange connected to the first end of the diaphragm assembly and also to the sleeve; and
   a first rotatable component connected to the first flange.

20. The coupling of claim 18, further comprising:
   a second flange connected to the second side of the diaphragm assembly and also to the stud; and
   a second rotatable component connected to the second flange.

* * * * *